United States Patent
Seddon et al.

(10) Patent No.: US 7,472,606 B2
(45) Date of Patent: Jan. 6, 2009

(54) SINGLE INPUT, MULTIPLE OUTPUT FLOW METER

(75) Inventors: Stephen Seddon, Stockport (GB); Eugene M. Shanahan, Longmont, CO (US); Steven M. Jones, Erie, CO (US); Charles Paul Stack, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 11/816,753

(22) PCT Filed: Feb. 23, 2005

(86) PCT No.: PCT/US2005/006138

§ 371 (c)(1),
(2), (4) Date: Aug. 21, 2007

(87) PCT Pub. No.: WO2006/091199

PCT Pub. Date: Aug. 31, 2006

(65) Prior Publication Data
US 2008/0257065 A1    Oct. 23, 2008

(51) Int. Cl.
*G01F 1/56* (2006.01)
(52) U.S. Cl. .............................. 73/861.355
(58) Field of Classification Search ............ 73/861.355, 73/861.356, 861.357, 1.35
See application file for complete search history.

(56) References Cited

U.S. PATENT DOCUMENTS

| | | | | |
|---|---|---|---|---|
| 4,109,524 A | * | 8/1978 | Smith | ..................... 73/861.357 |
| 4,879,910 A | * | 11/1989 | Lew | ..................... 73/861.355 |
| 4,882,935 A | * | 11/1989 | Lew | ..................... 73/861.357 |
| 5,233,861 A | * | 8/1993 | Gore et al. | ................... 73/1.16 |
| 5,661,232 A | | 8/1997 | Van Cleve et al. | |
| 6,360,579 B1 | | 3/2002 | De Boom et al. | |
| 2002/0088822 A1 | | 7/2002 | Todd | |
| 2003/0062381 A1 | | 4/2003 | Todd | |

\* cited by examiner

*Primary Examiner*—Jewel Thompson
(74) *Attorney, Agent, or Firm*—The Ollila Law Group LLC

(57) ABSTRACT

A single input, multiple output flow meter (200) is provided. The flow meter (200) includes an intake conduit (202) and a flow divider (203). The flow meter (200) further includes a first flow sensor element (204) coupled to the flow divider (203), including a first output conduit (206), and is configured to generate a first flow signal. The flow meter (200) further includes at least a second flow sensor element (205) coupled to the flow divider (203), including a second output conduit (207), and is configured to generate a second flow signal. The input flow can be metered through the first output conduit (206) by the first flow sensor element (204), can be metered through the second output conduit (207) by the second flow sensor element (205), or can be simultaneously metered through both the first output conduit (206) by the first flow sensor element (204) and through the second output conduit (207) by the second flow sensor element (205).

20 Claims, 4 Drawing Sheets

SINGLE INPUT, MULTIPLE OUTPUT FLOW METER

BACKGROUND OF THE INVENTION

1. Field of the Invention

The present invention relates to a single input, multiple output flow meter, and more particularly to a single input, multiple output flow meter that can be used for metering fuels and alternative fuels.

2. Statement of the Problem

Vibrating conduit sensors, such as Coriolis mass flow meters, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as two independent pairs of wires. The instrumentation receives signals from the two pickoff sensors and processes the signals in order to derive a mass flow rate measurement.

Flow meters are used to perform mass flow rate measurements for a wide variety of flow fluids. One area in which Coriolis flow meters can potentially be used is in the metering and dispensing of alternative fuels. The alternative fuels market continues to expand in response to increasing concerns over pollution and further in response to increasing concerns about the cost and availability of unleaded gasoline and other traditional fuels. In fact, many governments are becoming involved by enacting legislation promoting the use of alternative fuels.

An opportunity for the use of Coriolis meters in the alternative fuels market is in the filling of vehicles, such as cars, buses, etc. In the prior art, the filling of individual vehicles has been performed at filling stations utilizing traditional gasoline pumps or utilizing compressed natural gas (CNG) dispensers for alternative fuels. Typical traditional gasoline fuel dispensers require two individual and independent meters so that two vehicles can be filled simultaneously. However, the overall cost and size of an alternative fuels fuel pump must be minimized in order for the manufacture of the pump to be competitive in such a growing industry. Therefore, a challenge exists in being able to develop a cost-effective fuel meter that can provide two simultaneous fuel flow measurements.

SUMMARY OF THE SOLUTION

The present invention helps solve the problems associated with dispensing and metering of fuels, such as the dispensing and metering of alternative fuels.

A single input, multiple output flow meter is provided according to an embodiment of the invention. The flow meter comprises an intake conduit adapted for receiving a fluid flow and a flow divider coupled to the intake conduit. The flow divider divides the fluid flow into at least a first flow and a second flow. The flow meter further comprises a first flow sensor element coupled to the flow divider, including a first output conduit, and is configured to generate a first flow signal corresponding to the first flow. The flow meter further comprises at least a second flow sensor element coupled to the flow divider, including a second output conduit, and is configured to generate a second flow signal corresponding to the second flow. The input flow can be metered through the first output conduit by the first flow sensor element, can be metered through the second output conduit by the second flow sensor element, or can be simultaneously metered through both the first output conduit by the first flow sensor element and through the second output conduit by the second flow sensor element.

A single input, multiple output flow meter is provided according to an embodiment of the invention. The flow meter comprises an intake conduit adapted for receiving a fluid flow and a flow divider coupled to the intake conduit. The flow divider divides the fluid flow into at least a first flow and a second flow. The flow meter further comprises a first flow sensor element coupled to the flow divider, including a first output conduit, and is configured to generate a first flow signal corresponding to the first flow. The flow meter further comprises at least a second flow sensor element coupled to the flow divider, including a second output conduit, and is configured to generate a second flow signal corresponding to the second flow. The flow meter further comprises meter electronics that receives the first flow signal and the second flow signal and generates a corresponding first fuel flow measurement and a corresponding second fuel flow measurement. The flow meter further comprises a casing that includes the flow divider, the first flow sensor element, the second flow sensor element, the meter electronics, at least part of the intake conduit, at least part of the first output conduits, and at least part of the second output conduit. The input flow can be metered through the first output conduit by the first flow sensor element, can be metered through the second output conduit by the second flow sensor element, or can be simultaneously metered through both the first output conduit by the first flow sensor element and through the second output conduit by the second flow sensor element.

A method of forming a single input, multiple output flow meter is provided according to an embodiment of the invention. The method comprises providing an intake conduit adapted for receiving a fluid flow and providing a flow divider coupled to the intake conduit. The flow divider divides the fluid flow into at least a first flow and a second flow. The method further comprises providing a first flow sensor element coupled to the flow divider, including a first output conduit and configured to generate a first flow signal corresponding to the first flow. The method further comprises providing at least a second flow sensor element coupled to the flow divider, including a second output conduit and configured to generate a second flow signal corresponding to the second flow. The input flow can be metered through the first output conduit by the first flow sensor element, can be metered through the second output conduit by the second flow sensor element, or can be simultaneously metered through both the first output conduit by the first flow sensor element and through the second output conduit by the second flow sensor element.

ASPECTS

In one aspect, the first flow sensor element and the second flow sensor element comprise Coriolis flow meter sensor elements.

In another aspect, the fluid flow comprises a fuel or an alternative fuel, such as compressed natural gas (CNG) or liquefied petroleum gas (LPG).

In yet another aspect, the flow meter further comprises a casing that includes the flow divider, the first flow sensor element, at least the second flow sensor element, at least part of the intake conduit, at least part of the first output conduit, and at least part of the second output conduit.

In yet another aspect, the flow divider divides the fluid flow into the first flow and the second flow and wherein an angle between the first flow and the second flow is about forty-five degrees.

In yet another aspect, the flow divider divides the fluid flow into the first flow and the second flow and wherein an angle between the first flow and the second flow is about ninety degrees.

In yet another aspect, the first flow sensor element and the second flow sensor element comprise at least one first flow conduit for transporting the first flow, at least one second flow conduit for transporting the second flow, a first driver for vibrating the at least one first flow conduit, a second driver for vibrating the at least one second flow conduit, two or more first pickoff sensors for measuring the resulting vibratory motion of the at least one first flow conduit and generating the first flow signal, and two or more second pickoff sensors for measuring the resulting vibratory motion of the at least one second flow conduit and generating the second flow signal.

In yet another aspect, the flow meter further comprises meter electronics that receives the first flow signal and the second flow signal and generates a corresponding first fuel flow measurement and a corresponding second fuel flow measurement.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
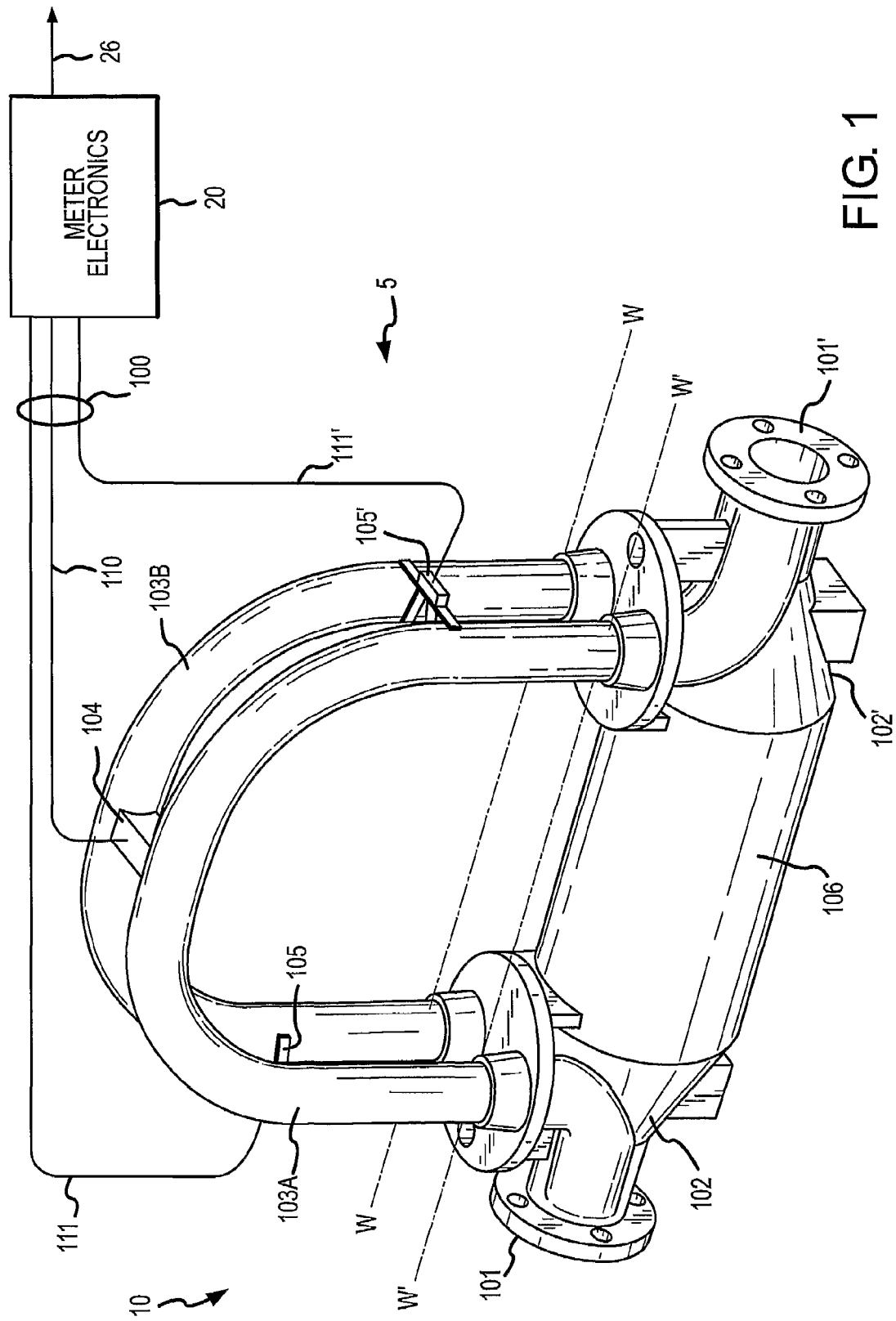
FIG. 1 illustrates a Coriolis flow meter comprising a flow meter assembly and meter electronics.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used in any type of Coriolis flow meter regardless of the number of drivers, pick-off sensors, flow conduits, or the operating mode of vibration.

Flow meter assembly 10 includes a pair of flanges 101 and 101', manifolds 102 and 102', driver 104, pick-off sensors 105-105', and flow conduits 103A and 103B. Driver 104 and pick-off sensors 105 and 105' are connected to flow conduits 103A and 103B.

Flanges 101 and 101' are affixed to manifolds 102 and 102'. Manifolds 102 and 102' can be affixed to opposite ends of a spacer 106. Spacer 106 maintains the spacing between manifolds 102 and 102' to prevent undesired vibrations in flow conduits 103A and 103B. When flow meter assembly 10 is inserted into a conduit system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W-W and W'-W' respectively. The flow conduits extend outwardly from the manifolds in an essentially parallel fashion.

Flow conduits 103A and 103B are driven by driver 104 in opposite directions about their respective bending axes W and W' and at what is termed the first out of phase bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104.

Meter electronics 20 receives sensor signals on leads 111 and 111', respectively. Meter electronics 20 produces a drive signal on lead 110 which causes driver 104 to oscillate flow conduits 103A and 103B. Meter electronics 20 processes left and right velocity signals from pick-off sensors 105 and 105' in order to compute a mass flow rate. Path 26 provides an input and an output means that allows meter electronics 20 to interface with an operator or with other electronic systems. The description of FIG. 1 is provided merely as an example of the operation of a Coriolis flow meter and is not intended to limit the teaching of the present invention.

Figure 2:
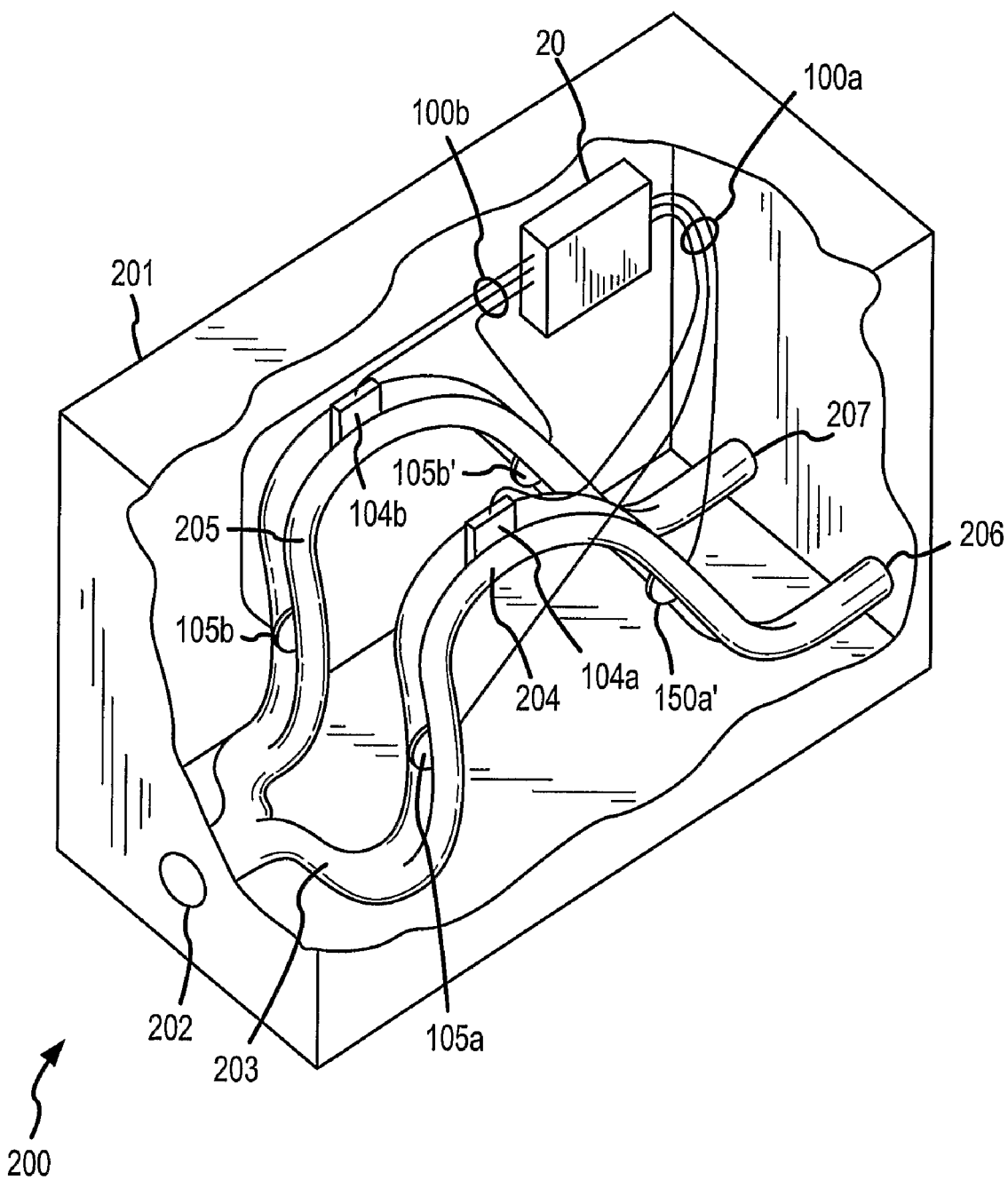
FIG. 2 is a diagram of a single input, multiple output flow meter according to an embodiment of the invention.

FIG. 2 is a diagram of a single input, dual output flow meter 200 according to an embodiment of the invention. The flow meter 200 can comprise a dual output meter, as shown, or can include more than two outputs. The flow meter 200 can be used to meter a first flow and a second flow of a flow fluid, such as a fuel. The fuel can include traditional fuels such as gasoline and diesel, and further can include alternative fuels, such as compressed natural gas (CNG), liquefied petroleum gas (LPG), and other alternatives to gasoline and diesel, including fuels that comprise various percentages of liquid and gaseous components. However, it is contemplated that other flow materials can be metered and are within the scope of the description and claims.

The flow meter 200 includes a casing 201, an intake conduit 202, a flow divider 203, a first flow sensor element 204 and a corresponding first output conduit 206, at least a second flow sensor element 205 and a corresponding second output conduit 207, and meter electronics 20.

The casing 201 includes the flow divider 203, the first flow sensor element 204, the second flow sensor element 205, at least part of the intake conduit 202, at least part of the first output conduit 206, and at least part of the second output conduit 207. It should be understood that the intake conduit 202, the first output conduit 206, and the second output conduit 207 can extend out of the casing 201 in some embodiments.

The flow divider 203 is coupled to the intake conduit 202 and further to the first flow sensor element 204 and the second flow sensor element 205. The first flow sensor element 204 is coupled to the first output conduit 206 while the second flow sensor element 205 is coupled to the second output conduit 207. A flow fluid enters through the intake conduit 202 and the flow divider 203. At the flow divider 203, the flow fluid can flow through just the first flow sensor element 204, through just the second flow sensor element 205, or can flow simultaneously through the first flow sensor element 204 and through the second flow sensor element 205. The flow fluid flows through one or both of the first flow sensor element 204 and the second flow sensor element 205 and exits out of one or both of the first output conduit 206 and the second output conduit 207. A first flow signal and/or a second flow signal are generated by the first flow sensor element 204 and the second flow sensor element 205 and are transmitted to the meter electronics 20 via the leads 100a and/or leads 100b. The meter electronics 20 receives the first flow signal and/or the second flow signal and generates a corresponding first fuel flow measurement and/or a corresponding second fuel flow measurement. The first and second fuel flow measurements can be used by the meter electronics 20 to conduct a fuel transaction, and further can be transmitted to an operator or other computerized device via the path 26. Consequently, the input flow can be metered through the first output conduit 206 by the first flow sensor element 204, can be metered through the second output conduit 207 by the second flow sensor element 205, or can be simultaneously metered through both the first output conduit 206 by the first flow sensor element 204 and through the second output conduit 207 by the second flow sensor element 205. It should be understood that the flow meter 200 can include more than two output conduits and two flow sensor elements.

The flow divider 203 divides the input flow into the first flow and the second flow. In one embodiment of the flow divider 203, the flow divider 203 divides the two flows wherein an angle between the first flow and the second flow is about forty-five degrees. In another embodiment, the flow divider 203 divides the two flows wherein an angle between the first flow and the second flow is about ninety degrees. It should be understood that the two given angles are provided merely as examples. Other angles are contemplated and are within the scope of the description and claims.

The first flow sensor element 204 and the second flow sensor element 205 comprise any manner of flow sensor element. In one embodiment, the first flow sensor element 204 and the second flow sensor element 205 comprise Coriolis flow meter sensor elements. In one embodiment, the first flow sensor element 204 and the second flow sensor element 205 can be designed wherein the two sensor elements have slightly different vibrational characteristics in order to avoid stability and performance issues.

In the embodiment shown in the figure, the first flow sensor element 204 comprises at least one first flow conduit 103a for transporting the first flow and the second flow sensor element 205 comprises at least one second flow conduit 103b for transporting the second flow. The at least one first flow conduit 103a and the at least one second flow conduit 103b can comprise dual tube flow meter elements, as shown. Alternatively, in another embodiment the at least one first flow conduit 103a and the at least one second flow conduit 103b can comprise single tube flow meter elements and can further include two corresponding balance tubes (see FIG. 3). The single flow conduit embodiment can be employed where the flow fluid to be metered possesses only a narrow range of fluid densities.

In one embodiment, the flow sensor elements 204 and 205 can comprise a substantially U-shaped flow conduit(s), as shown. Alternatively, in an embodiment shown in FIG. 4 (below), the flow sensor elements 204 and 205 can comprise a substantially straight flow conduit(s). However, other shapes can also be used, and are within the scope of the description and claims.

The first flow sensor element 204 further comprises a first driver 104a for vibrating the at least one first flow conduit 103a and two or more first pickoff sensors 105a and 105a' for measuring the resulting vibratory motion of the at least one first flow conduit 103a and generating the first flow signal. The second flow sensor element 205 likewise further comprises a second driver 104b for vibrating the at least one second flow conduit 103b and two or more second pickoff sensors 105b and 105b' for measuring the resulting vibratory motion of the at least one second flow conduit 103b and generating the second flow signal.

In some embodiments, the meter 200 can include some manner of pressure regulation in order to prevent flow changes at any outlet from affecting the availability of the flow material from other outlets. Consequently, a suitable pressure regulator (or regulators) can be included at any point upstream of the flow sensors 204, 205, etc., including before the intake conduit 202. Alternatively, one or more pressure regulators can be included downstream of the flow sensors 204, 205, etc.

Figure 3:
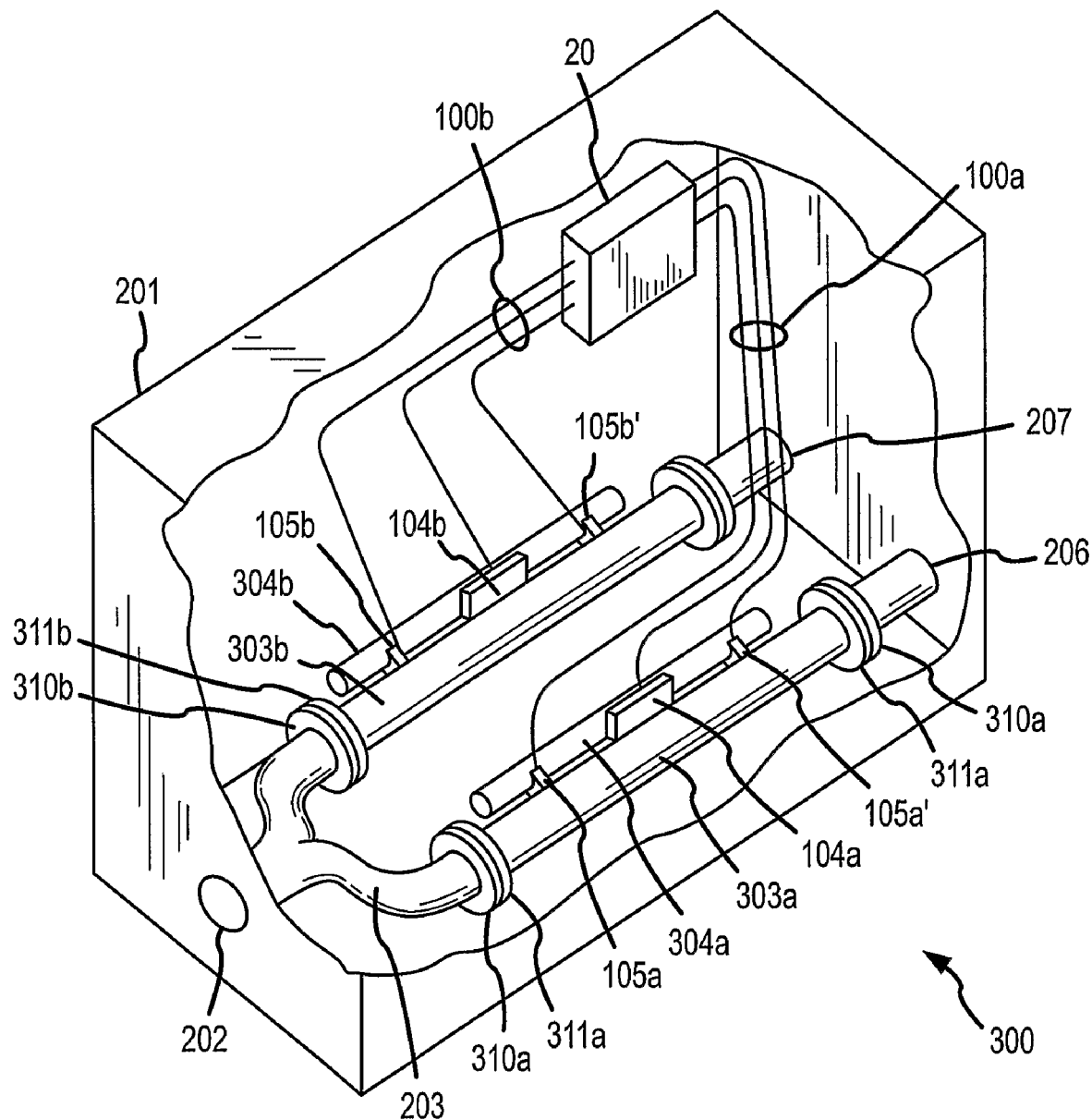
FIG. 3 is a diagram of a single input, multiple output flow meter according to another embodiment of the invention.

FIG. 3 is a diagram of a single input, multiple output flow meter 200 according to another embodiment of the invention. Components in common with the previous figures share reference numbers. In this embodiment, the first flow sensor element 204 and the second flow sensor element 205 comprise single tube flow meters comprising straight flow tube conduits 303a and 303b coupled to balance beams 304a and 304b. The straight flow tube conduits 303a and 303b can be affixed to the flow divider 203, to the first output conduit 206, and to the second output conduit 207 using first flanges 310a and 311a and second flanges 310b and 311b.

Figure 4:
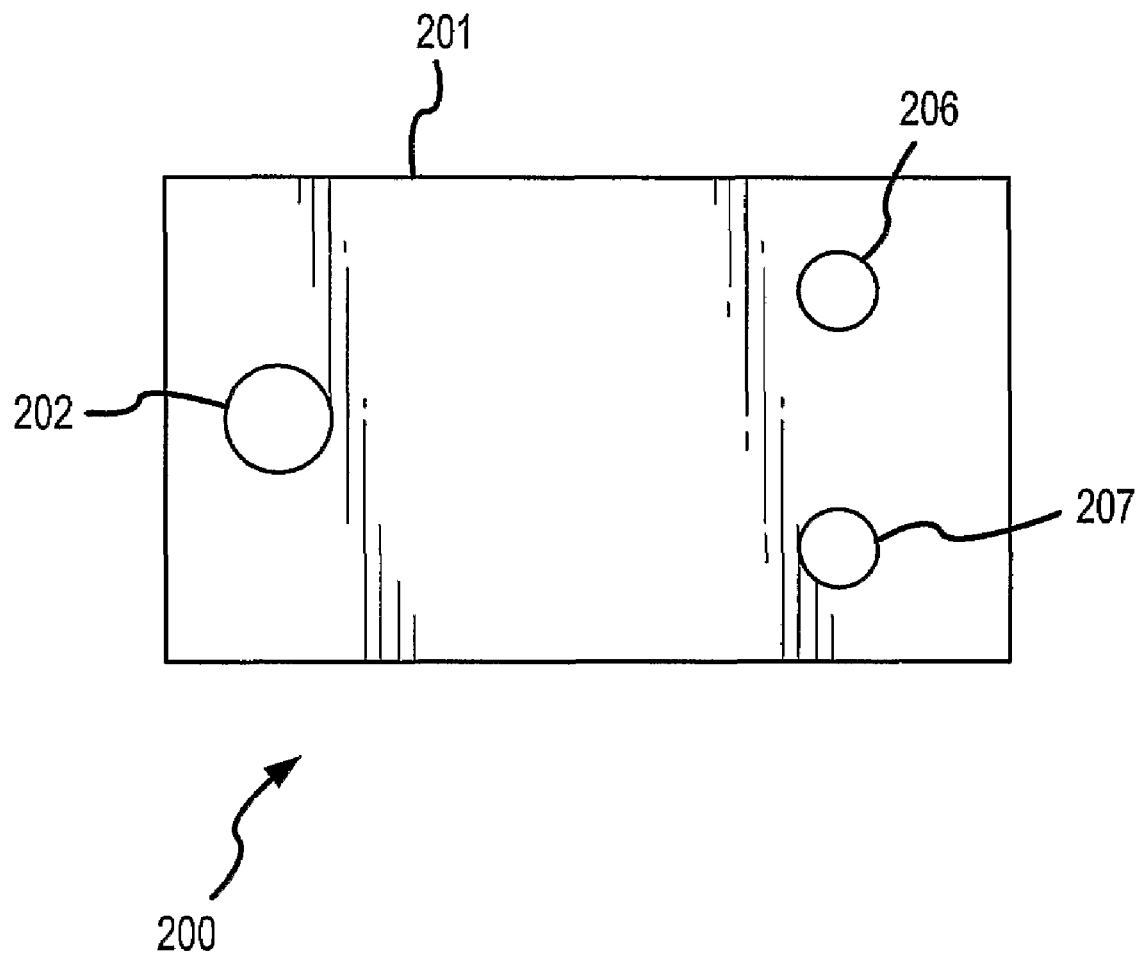
FIG. 4 shows a face of the casing that includes the intake conduit, the first output conduit, and the second output conduit according to an embodiment of the invention.

FIG. 4 shows a face of the casing 201 that includes the intake conduit 202, the first output conduit 206, and the second output conduit 207 according to an embodiment of the invention. In this embodiment, the intake conduit 202, the first output conduit 206, and the second output conduit 207 are all on a common exterior face of the casing 201. However, it should be understood that in alternative embodiments the intake conduit 202, the first output conduit 206, and the second output conduit 207 can be variously located on separate or different exterior faces of the flow meter 200. The intake conduit 202, the first output conduit 206, and the second output conduit 207 can include threading (such as pipe threading, for example) that enable external conduits to be removably attached to the flow meter (200).

The single input, dual output fuel meter according to the invention can be employed according to any of the embodiments in order to provide several advantages, if desired. The invention provides a fuel meter that performs fuel metering and dispensing of alternative fuels. The invention provides a fuel meter that is capable of metering out first and second fuel flows.

Advantageously, cost of the fuel meter will be lower due to the sharing of the components. In one embodiment, a single case and feedthrough can be used in the invention. Because two independent flow sensor elements are housed in a single housing, the overall size of the fuel meter (and the complete metering system) can be reduced, thus reducing the cost to install the sensor into a gas pump. In addition, housing dual sensor element system within a housing also opens up the opportunity to utilize a single electronic device to power and measure the two flow streams.

What is claimed is:

1. A single input, multiple output flow meter (200), comprising:
    an intake conduit (202) adapted for receiving a fluid flow;
    a flow divider (203) coupled to the intake conduit (202), with the flow divider (203) dividing the fluid flow into at least a first flow and a second flow;
    a first flow sensor element (204) coupled to the flow divider (203) and including a first output conduit (206) and configured to generate a first flow signal corresponding to the first flow; and
    at least a second flow sensor element (205) coupled to the flow divider (203) and including a second output conduit (207) and configured to generate a second flow signal corresponding to the second flow;
    wherein the input flow can be metered through the first output conduit (206) by the first flow sensor element (204), can be metered through the second output conduit (207) by the second flow sensor element (205), or can be simultaneously metered through both the first output conduit (206) by the first flow sensor element (204) and through the second output conduit (207) by the second flow sensor element (205).

2. The flow meter (200) of claim 1, wherein the first flow sensor element (204) and the second flow sensor element (205) comprise Coriolis flow meter sensor elements.

3. The flow meter (200) of claim 1, with the fluid flow comprising a fuel or an alternative fuel, such as compressed natural gas (CNG) or liquefied petroleum gas (LPG).

4. The flow meter (200) of claim 1, further comprising a casing (201) that includes the flow divider (203), the first flow sensor element (204), the second flow sensor element (205), at least part of the intake conduit (202), at least part of the first output conduit (206), and at least part of the second output conduit (207).

5. The flow meter (200) of claim 1, wherein the flow divider (203) divides the fluid flow into the first flow and the second flow and wherein an angle between the first flow and the second flow is about forty-five degrees.

6. The flow meter (200) of claim 1, wherein the flow divider (203) divides the fluid flow into the first flow and the second flow and wherein an angle between the first flow and the second flow is about ninety degrees.

7. The flow meter (200) of claim 1, with the first flow sensor element (204) and the second flow sensor element (205) comprising:
    at least one first flow conduit (103a) for transporting the first flow;
    at least one second flow conduit (103b) for transporting the second flow;
    a first driver (104a) for vibrating the at least one first flow conduit (103a);
    a second driver (104b) for vibrating the at least one second flow conduit (103b);
    two or more first pickoff sensors (105a) and (105a') for measuring the resulting vibratory motion of the at least one first flow conduit (103a) and generating the first flow signal; and
    two or more second pickoff sensors (105b) and (105b') for measuring the resulting vibratory motion of the at least one second flow conduit (103b) and generating the second flow signal.

8. The flow meter (200) of claim 1, further comprising meter electronics (20) that receives the first flow signal and the second flow signal and generates a corresponding first fuel flow measurement and a corresponding second fuel flow measurement.

9. A single input, multiple output flow meter (200), comprising:
    an intake conduit (202) adapted for receiving a fluid flow;
    a flow divider (203) coupled to the intake conduit (202), with the flow divider (203) dividing the fluid flow into at least a first flow and a second flow;
    a first flow sensor element (204) coupled to the flow divider (203) and including a first output conduit (206) and configured to generate a first flow signal corresponding to the first flow;
    at least a second flow sensor element (205) coupled to the flow divider (203) and including a second output conduit (207) and configured to generate a second flow signal corresponding to the second flow;
    meter electronics (20) that receives the first flow signal and the second flow signal and generates a corresponding first fuel flow measurement and a corresponding second fuel flow measurement; and
    a casing (201) that includes the flow divider (203), the first flow sensor element (204), the second flow sensor element (205), the meter electronics (20), at least part of the intake conduit (202), at least part of the first output conduits (204), and at least part of the second output conduit (205);
    wherein the input flow can be metered through the first output conduit (206) by the first flow sensor element (204), can be metered through the second output conduit (207) by the second flow sensor element (205), or can be simultaneously metered through both the first output conduit (206) by the first flow sensor element (204) and through the second output conduit (207) by the second flow sensor element (205).

10. The flow meter (200) of claim 9, wherein the first flow sensor element (204) and the second flow sensor element (205) comprise Coriolis flow meter sensor elements.

11. The flow meter (200) of claim 9, with the fluid flow comprising a fuel or an alternative fuel, such as compressed natural gas (CNG) or liquefied petroleum gas (LPG).

12. The flow meter (200) of claim 9, wherein the flow divider (203) divides the fluid flow into the first flow and the second flow and wherein an angle between the first flow and the second flow is about forty-five degrees.

13. The flow meter (200) of claim 9, wherein the flow divider (203) divides the fluid flow into the first flow and the second flow and wherein an angle between the first flow and the second flow is about ninety degrees.

14. The flow meter (200) of claim 9, with the first flow sensor element (204) and the second flow sensor element (205) comprising:
- at least one first flow conduit (103*a*) for transporting the first flow;
- at least one second flow conduit (103*b*) for transporting the second flow;
- a first driver (104*a*) for vibrating the at least one first flow conduit (103*a*);
- a second driver (104*b*) for vibrating the at least one second flow conduit (103*b*);
- two or more first pickoff sensors (105*a*) and (105*a'*) for measuring the resulting vibratory motion of the at least one first flow conduit (103*a*) and generating the first flow signal; and
- two or more second pickoff sensors (105*b*) and (105*b'*) for measuring the resulting vibratory motion of the at least one second flow conduit (103*b*) and generating the second flow signal.

15. A method of forming a single input, multiple output flow meter (200), the method comprising:
- providing an intake conduit (202) adapted for receiving a fluid flow;
- providing a flow divider (203) coupled to the intake conduit (202), with the flow divider (203) dividing the fluid flow into at least a first flow and a second flow;
- providing a first flow sensor element (204) coupled to the flow divider (203) and including a first output conduit (206) and configured to generate a first flow signal corresponding to the first flow; and
- providing at least a second flow sensor element (205) coupled to the flow divider (203) and including a second output conduit (207) and configured to generate a second flow signal corresponding to the second flow;
- wherein the input flow can be metered through the first output conduit (206) by the first flow sensor element (204), can be metered through the second output conduit (207) by the second flow sensor element (205), or can be simultaneously metered through both the first output conduit (206) by the first flow sensor element (204) and through the second output conduit (207) by the second flow sensor element (205).

16. The method of claim 15, wherein the first flow sensor element (204) and the second flow sensor element (205) comprise Coriolis flow meter sensor elements.

17. The method of claim 15, with the fluid flow comprising a fuel or an alternative fuel, such as compressed natural gas (CNG) or liquefied petroleum gas (LPG).

18. The method of claim 15, further comprising:
- providing a casing (201) that includes the flow divider (203), the first flow sensor element (204), the second flow sensor element (205), at least part of the intake conduit (202), at least part of the first output conduit (206), and at least part of the second output conduit (207); and
- providing meter electronics (20) that receives the first flow signal and the second flow signal and generates a corresponding first fuel flow measurement and a corresponding second fuel flow measurement.

19. The method of claim 15, wherein the flow divider (203) divides the fluid flow into the first flow and the second flow and wherein an angle between the first flow and the second flow is about forty-five degrees.

20. The method of claim 15, wherein the flow divider (203) divides the fluid flow into the first flow and the second flow and wherein an angle between the first flow and the second flow is about ninety degrees.

* * * * *